United States Patent [19]

Yamada et al.

[11] Patent Number: 5,576,866
[45] Date of Patent: Nov. 19, 1996

[54] LIQUID CRYSTAL DISPLAY HAVING POLYMER WALLS WITH A CHIRAL PITCH AND METHOD FOR PRODUCING THE SAME

[75] Inventors: Nobuaki Yamada, Higashiosaka; Shuichi Kozaki, Nara, both of Japan

[73] Assignee: Sharp Kabushiki Kaisha, Osaka, Japan

[21] Appl. No.: 394,946

[22] Filed: Feb. 24, 1995

[30] Foreign Application Priority Data

Mar. 25, 1994 [JP] Japan .................................. 6-056309

[51] Int. Cl.⁶ ............................ G02F 1/1339; G02F 1/13
[52] U.S. Cl. ................................ 359/81; 359/51; 359/52
[58] Field of Search ................. 359/494, 81, 51, 359/52, 62

[56] References Cited

U.S. PATENT DOCUMENTS

| | | | |
|---|---|---|---|
| 4,596,445 | 6/1986 | Fergason | 350/339 |
| 4,662,720 | 5/1987 | Fergason | 350/339 |
| 5,210,630 | 5/1993 | Heynderickx et al. | 359/105 |
| 5,333,074 | 7/1994 | Hikmet | 359/51 |
| 5,473,450 | 12/1995 | Yamada et al. | 359/51 |
| 5,490,001 | 2/1996 | Konuma | 359/56 |
| 5,506,704 | 4/1996 | Broer et al. | 359/65 |

FOREIGN PATENT DOCUMENTS

| | | |
|---|---|---|
| 59-226322 | 12/1984 | Japan . |
| 61-502128 | 9/1986 | Japan . |
| 1-269922 | 10/1989 | Japan . |
| 2-99920 | 4/1990 | Japan . |
| 2-153319 | 6/1990 | Japan . |
| 2-153318 | 6/1990 | Japan . |
| 3-61925 | 3/1991 | Japan . |
| 3-209425 | 9/1991 | Japan . |
| 3-278024 | 12/1991 | Japan . |
| 4-31823 | 2/1992 | Japan . |
| 4-31824 | 2/1992 | Japan . |
| 5-11237 | 1/1993 | Japan . |
| 5-27242 | 2/1993 | Japan . |
| 5-281519 | 10/1993 | Japan . |
| WO83/01016 | 3/1983 | WIPO . |
| WO85/04262 | 9/1985 | WIPO . |

Primary Examiner—William L. Sikes
Assistant Examiner—Charles Miller
Attorney, Agent, or Firm—Nixon & Vanderhye P.C.

[57] ABSTRACT

A liquid crystal display element of the present invention includes walls made from a polymer material and liquid crystal regions in contact with the walls between a pair of substrates, each having electrodes, wherein the liquid crystal region is in a selective reflection state and a chiral pitch of liquid crystal contained in the liquid crystal regions is longer than a chiral pitch of the walls made from a polymer material.

15 Claims, 4 Drawing Sheets

LIQUID CRYSTAL DISPLAY HAVING POLYMER WALLS WITH A CHIRAL PITCH AND METHOD FOR PRODUCING THE SAME

BACKGROUND OF THE INVENTION

1. Field of the Invention

The present invention relates to a liquid crystal display element used for a flat display for a personal computer, a liquid crystal TV, a portable display (including a film substrate), a reflection type cell requiring no backlight, and a transmission type cell such as a projection type cell, etc. In particular, the present invention relates to a liquid crystal display element having a liquid crystal region surrounded by a polymer wall, in which the liquid crystal is twisted by a twisted structure of the polymer wall and a method for producing the same.

2. Description of the Related Art

Basically, a liquid crystal display element with the above-mentioned structure utilizes selective reflectivity of liquid crystal molecules caused by a twisted structure thereof. More specifically, the liquid crystal display element utilizes a transparent state of the liquid crystal molecules under the application of a voltage to a liquid crystal cell and a colored or opaque state of the liquid crystal molecules under the application of no voltage to a liquid crystal cell. Such a liquid crystal display element is well lighted with high contrast and a superior viewing angle characteristic. For these reasons, such a liquid crystal display element can be used for a portable display device and a display device for a plurality of people.

As described below, various display modes have been used in conventional examples of the above-mentioned liquid crystal display element.

Some examples thereof utilize an electro-optic effect. As such elements utilizing an electro-optic effect, Twisted Nematic (TN) type display elements and Super-twisted Nematic (STN) type display elements using nematic liquid crystal have been brought to the market-place. For such elements, polarizing plates are indispensable.

According to other display modes such as a dynamic scattering mode and a phase transition mode, the light scattering of liquid crystal molecules is utilized without using polarizing plates. In recent years, a liquid crystal display element requiring no polarizing plates and no alignment treatment have been proposed in which a transparent state and an opaque state are electrically controlled by using birefringence of liquid crystal. In such an element, the refractive index of an ordinary light is matched with that of a supporting medium, whereby a transparent state is displayed under the condition that liquid crystal molecules are aligned upon being applied with a voltage and a light scattering state (i.e., opaque state) is displayed, using the disorder of the alignment of the liquid crystal molecules under no application of a voltage.

According to still another display mode, a dichroic dye is added to a material for a liquid crystal display element. In such an element, liquid crystal molecules are aligned along polymer walls under no application of a voltage, whereby a director of the dichroic dye becomes random to display a black state. Under the application of a voltage, the liquid crystal molecules are aligned in the direction perpendicular to that of electrodes, whereby a weakly-colored state is displayed. Such a display mode is proposed in Japanese National Publication No. 61-502128. According to this Publication, a mixture containing liquid crystal and polymerizable or thermosetting material is injected between a pair of substrates, and the resin is cured by light-irradiation or by heating to allow the liquid crystal to deposit, thereby forming liquid crystal droplets in the resin.

According to still another display mode, a liquid crystal material containing nematic liquid crystal with a chiral agent added thereto, or cholesteric liquid crystal is used to cause selective reflection of liquid crystal molecules. Although a liquid crystal display element using such a material is excellent in display quality, it requires a high drive voltage (i.e., tens of voltages), making it difficult to put the element into practical use. Furthermore, Japanese Laid-Open Patent Publication No. 3-209425 discloses a liquid crystal display element in which the liquid crystal material containing nematic liquid crystal with a chiral agent added thereto or cholesteric liquid crystal is confined in a polymer. The liquid crystal display element disclosed in this publication is produced by injecting a mixture containing a liquid crystal material, a polymerizable material, a chiral agent, and a photopolymerization initiator between a pair of facing substrates, irradiating UV-rays to the mixture so as to allow the mixture to be photo-polymerized, whereby the mixture is phase-separated into a polymer material and chiral nematic liquid crystal. In such an element, a colored state (i.e., a state in which a region of chiral nematic liquid crystal selectively reflects light) and an opaque state are electrically controlled. In this element, helical rods of chiral nematic liquid crystal move in group; therefore, a high drive voltage is required, making it difficult to put the element into practical use.

Japanese Laid-Open Patent Publication No. 5-27242 proposes a non-light scattering display mode in which the viewing angle characteristic of a liquid crystal cell is improved by using polarizing plates. According to this display mode, a mixture containing liquid crystal and a polymerizable material is injected between a pair of substrates, the mixture is irradiated with light to be phase-separated, whereby a display medium made of a composite material containing liquid crystal and a polymer material is produced. In this display mode, the alignment of liquid crystal domains becomes random due to the polymer material thus generated and liquid crystal molecules in each domain rise in different directions under the application of a voltage. Therefore, apparent refractive indices from the respective directions become equal, and the viewing angle characteristic in an intermediate state (i.e., a state between a transparent state and an opaque state) can be improved.

Furthermore, recently, the inventors of the present application have proposed a liquid crystal display element in which the irradiation of light during photopolymerization is controlled by using a photomask, whereby liquid crystal domains are aligned in an omnidirection (i.e., radial direction) in each pixel region (Japanese Patent Application No. 4-286487). In this liquid crystal display element, the viewing angle characteristic is improved by controlling the alignment of liquid crystal molecules with a voltage.

In spite of the above-mentioned advantages of the respective display modes, the following problems remain unsolved.

(i) In the liquid crystal display element utilizing the selective reflection of a cholesteric phase or a chiral nematic phase, the liquid crystal regions keep energy for spiraling themselves. Therefore, an intensive electric field is required for removing such a helical state from the liquid crystal regions to allow the liquid crystal molecules in the regions to be aligned in the direction perpendicular to the electric field. Thus, such elements lack practical values.

(ii) In the liquid crystal display element using liquid crystal with a dichroic dye added thereto, the dichroic ratio of the dye cannot be utilized to the full, resulting in a dark and low contrast.

(iii) In the ordinary display modes (e.g., TN, STN, FLC, and ECB modes), sufficient cell thickness cannot be maintained in the display regions. Therefore, the cell thickness is likely to be changed by external force, and an ununiform display locally occurs due to a pen input.

SUMMARY OF THE INVENTION

The liquid crystal display element of the invention, includes walls made from a polymer material and liquid crystal regions in contact with the walls between a pair of substrates, each having electrodes, wherein the liquid crystal region is in a selective reflection state and a chiral pitch of liquid crystal contained in the liquid crystal regions is longer than a chiral pitch of the walls made from a polymer material.

In one embodiment of the present invention, a liquid crystalline polymer material is contained in the walls made from a polymer material.

In another embodiment of the present invention, the liquid crystalline polymer material contains a compound having a chiral center.

In another embodiment of the present invention, the walls made from a polymer material are patterned, and the liquid crystal display element has liquid crystal regions at least partially surrounded by the walls.

In another embodiment of the present invention, the liquid crystal regions are surrounded by the walls made from a polymer material with a three-dimensional network structure.

In another embodiment of the present invention, a helical axis is substantially perpendicular to the substrates.

In another embodiment of the present invention, a reflective plate is provided on one of the pair of substrates.

In another embodiment of the present invention, a coloring plate is provided on one of the pair of substrates.

In another embodiment of the present invention, the above-mentioned liquid crystal display element further includes a color filter allowing a visible light to transmit therethrough and blocking UV-rays to 70% or less at a wavelength of 365 nm.

In another embodiment of the present invention, the above-mentioned liquid crystal display element includes a reflective plate at least part of which has regular portions for allowing light to pass through.

According to another aspect of the present invention, a method for producing a liquid crystal display element, includes the steps of:

injecting a mixture containing a liquid crystal material, a liquid crystalline compound having polymerizable functional groups in its molecules, a polymerizable compound, and a photopolymerization initiator between a pair of substrates, either one of the substrates being transparent and each of the substrates having electrodes, molecules having a chiral center being added to either one of the liquid crystal material or the liquid crystalline compound; and irradiating light having regular strong and weak portions to the mixture to phase-separate the mixture into a liquid crystal material and a polymer material by photopolymerization, thereby allowing at least part of liquid crystal regions to be surrounded by walls made from the polymer material.

In one embodiment of the present invention, a photomask is used for allowing the light to have regular strong and weak portions.

In another embodiment of the present invention, at least one of an electric field and a magnetic field is provided to the mixture during the light irradiation.

In another embodiment of the present invention, the mixture is photo-polymerized under a condition of one of an isotropic phase and a nematic phase, and the mixture is photo-polymerized again under a condition of one of a smectic phase and a nematic phase.

In another embodiment of the present invention, the mixture is injected between the pair of substrates under a condition of one of an isotropic phase and a nematic phase, the mixture is heated so as to be an isotropic phase, the mixture is then cooled so as to be a nematic phase, and the mixture is irradiated with UV-rays.

Thus, the invention described herein makes possible the advantages of: (1) providing a well-lighted liquid crystal display element with a high contrast and a high practical value, in which an ununiform display is not likely to occur due to a pen input; and (2) providing a method for producing a well-lighted liquid crystal display element with a high contrast and a high practical value, in which an ununiform display is not likely to occur due to a pen input.

These and other advantages of the present invention will become apparent to those skilled in the art upon reading and understanding the following detailed description with reference to the accompanying figures.

DESCRIPTION OF THE PREFERRED EMBODIMENTS

The inventors of the present invention have earnestly studied a liquid crystal display element in which a twist of liquid crystal molecules contributing to the selective reflection of light occurs even under the condition that a compound containing a chiral center is not added to a liquid crystal material or a small amount of such a compound is added thereto. Furthermore, the inventors studied the effect of polymer walls in a liquid crystal cell on an external force caused by a pen input or the like.

Figure 1A:
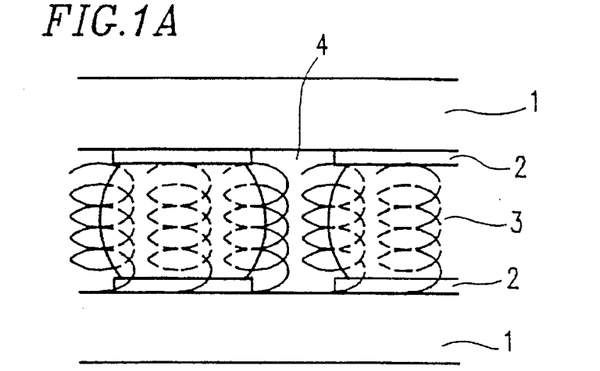
FIG. 1A is a cross-sectional view of a liquid crystal display element of the present invention, showing an operation principle thereof under the application of no voltage.

As shown in FIG. 1A, a liquid crystal cell of the present invention has a micro-cell structure including a liquid crystal region 3 substantially surrounded by a polymer wall 4 between a pair of substrates 1 each having electrodes 2. Unlike a polymer wall as described in Japanese Laid-Open Patent Publication No. 4-323616, the polymer wall 4 is in close contact with the substrates 1. According to Japanese Laid-Open Patent Publication No. 4-323616, polymer walls are formed on one of substrates, then, the other substrate is attached to the substrate on which the polymer walls are formed to fabricate a liquid crystal cell, and a liquid crystal material is injected between the substrates. Thus, the resulting polymer walls are not sufficiently bonded to the substrates.

According to the present invention, the polymer walls 4 are strongly bonded to the substrates 1, as described above. Therefore, a cell thickness is not likely to be changed by an external force and hence the change in color can be prevented even when a pen input is conducted. Furthermore, the liquid crystal cell of the present invention has improved resistance to shock when being dropped.

A helical pitch will be given to the polymer walls 4 by forming the polymer walls 4 with a polymer containing a liquid crystalline polymer. More specifically, a helical pitch, which allows the liquid crystalline polymer to be spiraled to selectively reflect light, is given to the polymer walls 4. Liquid crystal molecules in the liquid crystal regions 3 have the same helical pitch as that of the polymer walls 4, so that the selective reflection also occurs in the liquid crystal regions 3.

Figure 1B:
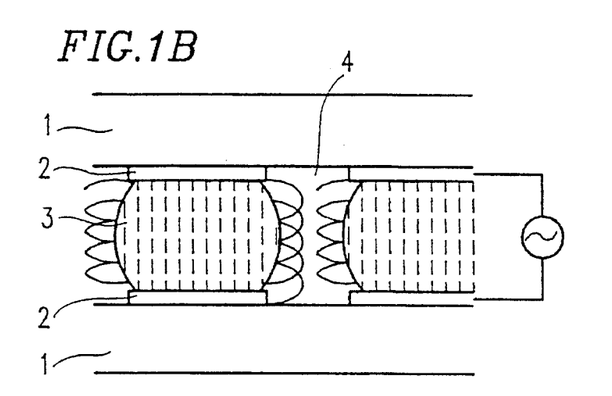
FIG. 1B is a cross-sectional view of a liquid crystal display element of the present invention, showing an operation principle thereof under the application of a voltage.

In some cases, a polymer thin film is formed at an interface between the liquid crystal regions 3 and the substrates 1. In this case, the liquid crystal regions 3 are three-dimensionally surrounded by the polymer walls 4, so that the helical alignment regulating force of the polymer walls 4 is transmitted to the liquid crystal molecules in the liquid crystal regions 3. As a result, a uniform helical structure of the liquid crystal regions 3 can be obtained. When a voltage is applied to the liquid crystal cell under this condition, as shown in FIG. 1B, the helical structure of the liquid crystal regions 3 is easily disintegrated because of a small amount of a chiral agent in the liquid crystal regions 3. That is, the liquid crystal molecules in the liquid crystal regions 3 are aligned with a low voltage in a direction perpendicular to an electric field to display a transparent state. As is understood from the above description, the liquid crystal display element of the present invention can be driven by a mode controlling a colored or opaque state and a transparent state without using polarizing plates. Furthermore, in this mode, a well-lighted display can be obtained with high contrast.

The following positioning of the liquid crystal regions 3 and the polymer walls 4 can be used: (1) A liquid crystal material is impregnated in a three-dimensional network structure of a polymer material; and (2) The liquid crystal regions 3 are surrounded by the polymer walls 4 as shown in FIG. 1A. It should be noted here that in both of structures, the selective reflection occurs in the polymer walls 4. In order to enhance contrast, the volume of the polymer walls 4 should be decreased. For this reason, the latter structure is more preferred.

Furthermore, the decrease in contrast caused by the polymer material can be more effectively prevented by forming most part of the polymer walls 4 outside of pixels, compared with the case where the polymer walls 4 are formed in a random position.

Hereinafter, other characteristics of the liquid crystal display element of the present invention will be described.
(Helical pitch)

The helical pitch of the liquid crystal regions is an important factor in the liquid crystal display element of the present invention. The helical pitch determines a wavelength of the selective reflection of the liquid crystal regions. The conditions for the selective reflection used in the present invention are considered to be the same as those generally used. More specifically, a main wavelength $\lambda_O$ of light selectively reflected is represented by the following Formula (1):

$$\lambda_O = n \cdot p \quad (1)$$

where n is an average refractive index $((n_e^2+n_o^2)/2)^{1/2}$, and p is a helical pitch; $n_o$ is an ordinary refractive index and $n_e$ is an extraordinary refractive index.

In the liquid crystal display element of the present invention, it is preferred to select n and p so that the main wavelength $\lambda_O$ is in a visible light range (i.e., 400 to 800 nm). Furthermore, in a case where the main wavelength $\lambda_O$ is in the vicinity of one value, a colored display is conducted, and in a case where the main wavelength $\lambda_O$ takes various values, a white display is conducted since a visible light is almost completely reflected. In the liquid crystal display element of the present invention, the helical structure of the polymer walls is transmitted to the liquid crystal regions. Therefore, by changing the amount of a chiral agent in the polymer material contained in the polymer walls, the wavelength range of light to be selectively reflected by the liquid crystal regions can be changed.

The liquid crystal display element of the present invention uses a display medium made of a mixture containing a polymer material and a liquid crystal material. Therefore, in a case where the polymer regions are not covered with a black mask after the element is completed, the liquid crystal regions and the polymer regions can be seen by observers. In this case, polymer liquid crystal in the polymer regions selectively reflect light because of its helical structure. Thus, even under the application of a voltage, the alignment of the liquid crystalline polymer molecules in the polymer regions do not change, causing deteriorated color purity and decreased display quality. In order to solve this problem, considering the fact that the helical pitch of the polymer regions and that of the liquid crystal regions are substantially the same, n in Formula (1) is set so as to satisfy the following Formula (2):

$$n \text{ (liquid crystal material)} > n \text{ (polymer material)} \quad (2)$$

In particular, by setting the main wavelength $\lambda_O$ of the polymer regions outside of a visible light range and setting the main wavelength $\lambda_O$ of the liquid crystal material of the liquid crystal regions in a visible light range, the decrease in display quality under the application of a voltage can be prevented.
(Structure of a liquid crystal display element)

Figure 2:
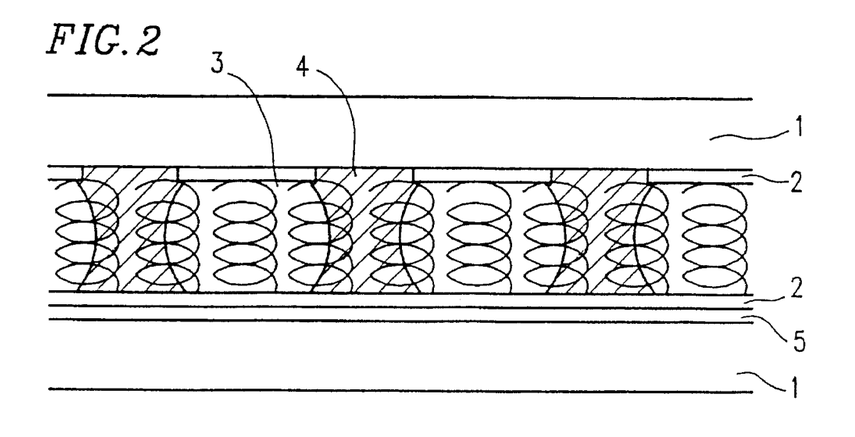
FIG. 2 is a schematic cross-sectional view of a reflection type liquid crystal display element of the present invention.

In a case of a reflection type cell, one of the substrates 1 has a scattering plate 5 on its side facing the other substrate as shown in FIG. 2, or one of the substrates 1 has a scattering plate or a coloring plate on its side which does not face the other substrate.

In a case where the liquid crystal display element of the present invention has a structure in which helical axes of the liquid crystal molecules rise in a direction perpendicular to the substrates 1 to selectively reflect light with a particular wavelength, the following states are respectively displayed. That is, under the application of no voltage, a colored state is displayed because of selective reflection, whereas under the application of a voltage, a transparent state of the liquid crystal regions 3 (i.e., a white state of the scattering plate 5) is displayed because a helical alignment of the liquid crystal molecules is disordered and the liquid crystal molecules are aligned in a direction of an electric field.

In a case where the liquid crystal display element of the present invention has a structure in which helical axes of the liquid crystal molecules are aligned at random, reflecting faces of the liquid crystal molecules are directed in a plurality of directions, so that lights with various wavelengths are reflected, resulting in a white display. In this case, by providing a coloring plate behind the liquid crystal regions, the liquid crystal regions 3 become transparent under the application of a voltage to allow the color of a coloring plate behind the liquid crystal regions to be displayed, and a white state is displayed under the application of no voltage.

Figure 3:
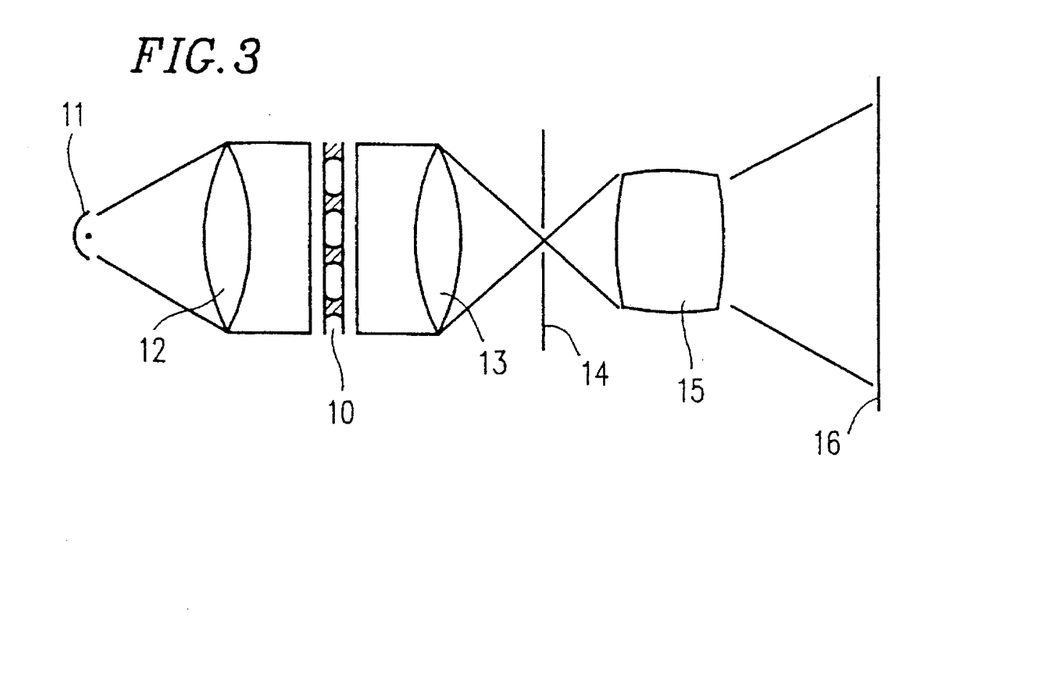
FIG. 3 is a schematic view of an optical system in which the liquid crystal display element of the present invention is used as a transmission type element.

In a case of a transmission type cell, helical axes of the liquid crystal molecules are aligned at random. As an optical system, a schlieren optical system as shown in FIG. 3, used in a polymer dispersed type liquid crystal display element, can be utilized. In this optical system, light emitted from a light source 11 is incident upon a liquid crystal display element 10 through a lens 12, scattering light from the liquid crystal display element 10 is transmitted through a lens 13 and blocked by a diaphragm 14, and only straight light can be obtained. As shown in FIG. 3, the optical system also includes a projective lens 15, and a screen 16.

The above-mentioned structure takes advantage of a characteristic of high backward scattering intensity caused by selective reflection and does not use polarizing plates; therefore, a well-lighted display can be obtained.

(Production of a display medium)

In the liquid crystal display element of the present invention, the liquid crystal molecules in the liquid crystal regions are required to be aligned in a helical shape by utilizing the helical alignment regulating force of the polymer walls. For achieving this, the following methods are used.

(1) A mixture containing a liquid crystal material and a polymerizable material (containing a liquid crystalline polymerizable material, a polymerizable chiral agent, and a photopolymerization initiator) is injected between facing substrates, and UV-rays substantially having strong and weak irradiating portions is irradiated to the mixture. According to this method, a polymer material is formed in UV-rays irradiated regions (or strong UV-rays irradiated regions), and a liquid crystal material is pushed out to UV-rays non-irradiated regions (or weak UV-rays irradiated regions). As a result, polymer regions are formed in the UV-rays irradiated regions and liquid crystal regions are formed in UV-rays non-irradiated regions.

Figure 4:
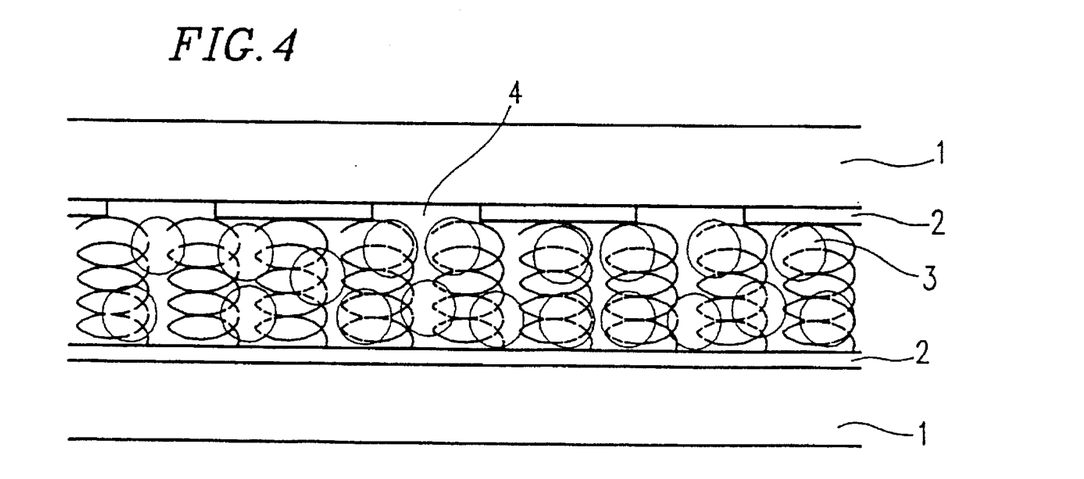
FIG. 4 is a schematic view of the liquid crystal display element of the present invention, in which liquid crystal molecules are confined in a polymer wall.

(2) UV-rays are irradiated to the entire regions of the mixture. As shown in FIG. 4, a cell fabricated by this method has the same structure as that of a so-called polymer dispersed type liquid crystal display element, in which liquid crystal regions are confined in a polymer.

In the liquid crystal display elements produced by the above-mentioned methods, a great amount of chiral agent is present in the polymer regions and liquid crystal molecules in the polymer regions have a helical structure. Furthermore, the interface between the polymer regions and the liquid crystal regions has an alignment regulating force for aligning the liquid crystal molecules of the liquid crystal regions in a helical state. For the purpose of having an affect of the helical alignment regulating force of the polymer regions on the liquid crystal molecules in the liquid crystal regions without losing liquid crystallinity of a mixture of the liquid crystal material and the polymerizable material, the polymerizable material can be partially or totally replaced by a liquid crystalline polymerizable material and/or a compound having chiral center can be used as the polymerizable material. Depending upon the cases, the polymerizable chiral agent and the photopolymerizable agent can be omitted.

(Method for forming regular distribution of uniform intensity of UV-rays irradiation)

In the first method described in Production of a display medium, the method for forming a distribution of UV-rays irradiation is important. It is preferred that a regular distribution of intensity of UV-rays irradiation is formed by light regulating means such as a photomask, microlens, and an interference plate.

A photomask may be positioned inside or outside of the cell, as long as a uniform distribution of intensity of UV-rays irradiation can be obtained. When the photomask is positioned away from the cell, an image above the photomask is blurred, so that the photomask is preferably provided as close as to the mixture of a liquid crystal material and a polymerizable material. In particular, when a photomask substantially blocking UV-rays is provided in the cell, the photomask is positioned close to the mixture; thus, this positioning is preferred. In a case of a reflection type liquid crystal display element, it is preferred that portions of a reflective plate corresponding to pixels have a reflecting function and the other portions thereof are made light-transmitting regions, or means for allowing a visible light to transmit therethrough but blocking UV-rays is provided on portions to be non-irradiated regions of one of the substrates. Examples of such means include a color filter and an organic polymer film.

It is desired that a light source emits collimated light. When the parallel degree of light beams is decreased, some light beams enter the non-irradiated regions to polymerize a polymer material in the liquid crystal regions. This causes a problem of decreased contrast. In the second method described in Production of a display medium, the parallel degree of light beams are not so strictly regulated.

According to the study results of the inventors of the present invention, the following has been made apparent: In the case of using light regulating means having light non-irradiating regions (or weak light irradiating regions), each having a size of 30% or less of each pixel, each liquid crystal region to be formed has a size of 30% or less of each pixel. As a result, the number of interfaces between the liquid crystal regions and the polymer regions per pixel is increased to cause more light scattering, resulting in the large decrease in contrast. For this reason, the light regulating means preferably has light non-irradiating regions (or weak light irradiating regions), each having a size larger than that of each pixel so that the number of interfaces between the liquid crystal regions and the polymer regions per pixel becomes extremely small. More specifically, a photomask allowing UV-rays to be irradiated to only portions other than pixels is preferably used. According to the present invention, in order that the alignment state of the polymer walls be transmitted to the liquid crystal regions, the size of each liquid crystal region is preferably 200 μm or less, and more preferably 100 μm or less for obtaining the uniformity of the liquid crystal regions.

The light non-irradiating regions (or weak light irradiating regions) of the light regulating means such as a photomask may have any shapes, as long as 30% or more of each pixel is covered and the intensity of UV-rays can be locally decreased. According to the present invention, there is no particular limit to the shape of the light non-irradiating regions. For example, a circle, a square, a rectangle, a hexagon, a diamond shape, a letter shape, configurations obtained by dividing these shapes with a curve or a straight line, configurations obtained by partially cutting away these shapes, combinations of these shapes, and combination of small shapes of the same. A photomask having light non-irradiating regions (or weak light irradiating regions) so as to correspond to pixel portions is preferably used. When such a photomask is used, the light scattering intensity in each pixel is decreased; therefore, the contrast of a liquid crystal display element to be obtained can be enhanced. According to the present invention, at least one shape may be selected. In order to enhance the uniformity of liquid crystal droplets, it is preferred to use only one type of shape.

According to the present invention, liquid crystal regions are regularly aligned in the horizontal direction, i.e., aligned along the pixels. Thus, the position of the light non-irradiating regions (or weak light irradiating regions) is an important factor. The light non-irradiating regions (or weak light irradiating regions) may be positioned in accordance with a pitch of the pixels. One light non-irradiating region is preferably positioned per pixel.

The light non-irradiating regions (or weak light irradiating regions) may be positioned so as to cover several pixels. Alternatively, the light non-irradiating regions may be positioned in a row or may be positioned per several pixels. Furthermore, it is not required that each light non-irradiating region (or each weak light irradiating region) be independently positioned. The light non-irradiating regions may be positioned so as to be connected to each other at each end, as long as the light non-irradiating regions (which effectively block UV-rays) have the above-mentioned shape and are positioned as described above. Furthermore, in a case where each pixel is large, polymer walls may be formed in each pixel. In this case, although contrast is decreased, the resistance of a liquid crystal cell against an external force can be maintained.

(Alignment of helical axes)

When a liquid crystal cell is fabricated under the condition that an external field is not applied, helical axes of liquid crystal molecules are aligned at random. Such a cell can be used in a mode for conducting a white display utilizing light reflection; however, when the cell is used in a mode for conducting a colored display utilizing selective light reflection, a helical pitch is varied depending upon the viewing angle, leading to decreased color purity. In order to weaken this phenomenon, it is required that the helical axes of the liquid crystal molecules are aligned in a predetermined direction, particularly in a direction perpendicular to the substrates.

The inventors of the present application have confirmed that the helical axes of the liquid crystal molecules are aligned in the direction of an external field such as a voltage and a magnetic field by irradiating UV-rays to the molecules while applying the external field (i.e., electric field or magnetic field) thereto. The intensity of the external field is preferably in the range of 0.2 times to twice $V_{10}$ (a voltage at which light transmittance of the liquid crystal cell becomes 10%) of the liquid crystal cell in the case where a liquid crystal material is injected between the substrates in a twisted nematic phase. When the intensity of the external field is less than $0.2 \times V_{10}$, which is smaller than a threshold value for operating the liquid crystal material, the helical axes are not effectively aligned. On the other hand, when the intensity of the external field is more than $2 \times V_{10}$, the helical axes are disentangled to deteriorate the selective reflection of light.

(Liquid crystalline polymerizable material (liquid crystalline compound having polymerizable functional groups in its molecules))

The liquid crystal display element of the present invention has a structure in which liquid crystalline compound is fixed on polymer walls in a helical state. Such a structure is obtained by polymerizing a polymerizable material of a homogeneous mixture containing a liquid crystal material and a polymerizable material (including liquid crystalline polymerizable material) in a helical state to phase-separate the mixture into liquid crystal and a polymer material.

Because of the above structure, the liquid crystal regions are subjected to a helical alignment regulating force from the vertical faces of the polymer walls as well as the surfaces of the substrates; as a result, the helical alignment of the liquid crystal regions is stabilized and the alignment thereof in the vicinity of the polymer walls can be made uniform. According to the conventional method in which the polymer walls are formed before attaching the substrates, the helical alignment regulating force of the polymer walls cannot be transmitted to the liquid crystal regions, and the alignment of the liquid crystal regions in the vicinity of the polymer walls cannot be kept uniform.

Examples of the liquid crystalline polymerizable material used in the present invention include those represented by the following Formula (3):

A-B-LC$_1$ or A-B-LC$_2$-B'-A'     (3)

where A, A' represent polymerizable functional groups and more specifically represent functional groups having a heterocyclic structure with a strain such as an epoxy group or unsaturated bonds, e.g., CH$_2$=CH—, CH$_2$=CH—COO—, CH$_2$=2 CCH$_3$—COO—, —N=C=O; and B, B' represent connecting groups connecting a polymerizable functional group and a liquid crystalline polymerizable compound and more specifically represent an alkyl chain (—(CH$_2$)$_n$—), an ester bond (—COO—), an ether bond (—O—), a polyethylene glycol chain (—CH$_2$CH$_2$O—), and combinations thereof. Connecting groups having 6 or more bonds from a polymerizable functional group to a rigid portion of a liquid crystal molecule are preferred.

(i) (In the case of monofunctional liquid crystal material)

LC$_1$ in Formula (3) represents a liquid crystalline compound. Examples of the compound include those represented by the following Formula (4) or a cholesterol ring, or its derivative.

D-E-G     (4)

where G represents a polar group allowing liquid crystal to exhibit anisotropy of dielectric constant, and more specifically represents a benzene ring, a cyclohexane ring, a paradiphenyl ring, a phenylcyclohexane ring, a terphenyl ring, and a diphenylcyclohexane ring, and the like having a functional group such as —CN, —OCH$_3$, —F, —Cl, —OCF$_3$, and —OCCl$_3$; E represents a functional group connecting D with G, such as a single bond, —CH$_2$—, —CH$_2$CH$_2$—, —O—, —C≡C—, and —CH≡CH—; and D represents a functional group bonding to B in Formula (3), which affects the degree of anisotropy of dielectric constant and anisotropy of refractive index, and more specifically represents a paraphenyl ring, a 1,10-diphenyl ring, a 1,4-cyclohexane ring, a 1,10-phenylcyclohexane ring, and the like. These groups may be used alone, or a plurality of groups connected by a connecting group such as a single bond, —CH$_2$CH$_2$—, —CH═CH—, —C≡C—, —COO—, —N═CH—, —O—, —N═N—, and —COS—may be used.

In the case where the liquid crystal material used in the liquid crystal display element of the present invention has positive anisotropy of dielectric constant, the above-mentioned functional group is preferably positioned in a benzene ring represented by G in Formula (4) so that the anisotropy of dielectric constant Δε becomes positive. More specifically, a benzene ring having a functional group at the 2-position, the 3' position, or the 2,3-position is preferred. In the case where the liquid crystal material used in the liquid crystal display element of the present invention has negative anisotropy of dielectric constant, the above-mentioned functional group is preferably positioned in a benzene ring represented by G in Formula (4) so that the anisotropy of dielectric constant As becomes negative. More specifically, a benzene ring having a functional group at the 4-position, the 3,4,5-position, or the 3,4-position is preferred.

In the case where the benzene ring has a plurality of functional groups, it is not required that these functional groups are the same. In both of the above-mentioned cases, it is not required to use only one kind of liquid crystalline compound. A plurality of liquid crystalline compounds can be used as long as they include at least one kind of the above-mentioned compounds.

(ii) (In the case of multi-functional liquid crystal material)

According to the present invention, compounds having two or more polymerizable functional groups per molecule can be used. In particular, bifunctional compounds are preferred, since their gelation speed is likely to be controlled at a relatively low rate, compared with compounds having three or more functional groups. These compounds are indispensable for enhancing the strength of the polymer in the cell. In the case of using a monofunctional liquid crystal material alone, liquid crystalline sites project at the interfaces between the liquid crystal and the polymer and the sites move together with the liquid crystal molecules along an electric field. This leads to the decrease in response speed. On the contrary, when using a bifunctional liquid crystal material, such a problem can be solved.

Examples of the compounds (represented by LC$_2$ in Formula (3)) having two or more polymerizable functional groups per molecule contain a paraphenyl ring, a 1,10-diphenyl ring, a 1,4-cyclohexane ring, and a 1,10-phenylcyclohexane ring. One kind of these rings can be contained in the compound, or a plurality of rings connected by a connecting group such as —CH$_2$CH$_2$, —CH═CH—, —C≡C—, —COO—, —N═CH—, —O—, —N═N—, and —COS—can be contained therein.

(Polymerizable chiral agent)

In the liquid crystal display element of the present invention, it is preferred that a chiral pitch of the polymer is made shorter than that of the liquid crystal material. For this purpose, a polymerizable chiral agent is required to be introduced into the polymer by photopolymerization.

The polymerizable chiral agent is a compound having a polymerizable functional group, and more specifically, a compound having a heterocyclic functional group with a strain such as an epoxy group or an unsaturated bond such as CH$_2$═CH—, CH$_2$═CH—COO—, CH$_2$═CCH$_3$—COO—, and —N═C═O and a functional group with optically active asymmetric carbon (S—or R-body). In particular, the polymerizable chiral agent is used by being mixed with the liquid crystal material, and hence, it preferably has a structure exhibiting liquid crystallinity such as LC$_1$ and LC$_2$.

The above-mentioned compound is introduced into the polymer during the polymerization step in the course of the production of the liquid crystal display element of the present invention, because of the polymerizable functional groups in its molecules. As a result, a polymer liquid crystal material has a helical structure. Furthermore, the compound is not likely to remain in the liquid crystal material, so that the concentration of the chiral agent in the liquid crystal material becomes lower than that in the polymer. Thus, a liquid crystal display element capable of controlling selective reflection and non-selective reflection at a low drive voltage can be produced.

(Polymerizable material)

As the polymerizable material, acrylic acid and acrylic ester having a long-chain alkyl group with at least three carbon atoms or a benzene ring are used. More specifically, examples of the polymerizable material include isobutyl acrylate, stearyl acrylate, lauryl acrylate, isoamyl acrylate, n-butyl methacrylate, n-lauryl methacrylate, tridecyl methacrylate, 2-ethylhexyl acrylate, n-stearyl methacrylate, cyclohexyl methacrylate, benzyl methacrylate, 2-phenoxyethyl methacrylate, isobornyl acrylate, and isobornyl methacrylate. For enhancing the physical strength of a polymer to be obtained, multi-functional compounds with two or more functional groups, such as R-684 (produced by Nippon Kayaku Co., Ltd.), bisphenol A dimethacrylate, bisphenol A diacrylate, 1,4-butanediol dimethacrylate, 1,6-hexanediol dimethacrylate, trimethylol propane trimethacrylate, trimethylol propane triacrylate, tetramethylolmethane tetraacrylate, and neopentyl diacrylate are used. Furthermore, for allowing a phase-separation to be clearly effected, halogenated, in particular, chlorinated and fluorinated compounds having surface tension lower than that of the above-mentioned compounds can be used. Examples of such compounds include 2,2,3,4,4,4-hexafluorobutyl methacrylate, 2,2,3,4,4,4-hexachlorobutyl methacrylate, 2,2,3,3-tetrafluoropropyl methacrylate, 2,2,3,3-tetrachloropropyl methacrylate, perfluorooctylethyl methacrylate, perchlorooctylethyl methacrylate, perfluorooctylethyl acrylate, and perchlorooctylethyl acrylate. (Liquid crystal material)

The liquid crystal material is an organic mixture exhibiting a liquid crystalline state in the vicinity of room temperature. Nematic liquid crystal (for dual frequency drive, including liquid crystal with Δε<0), cholesteric liquid crystal, or nematic liquid crystal with a chiral agent added are preferred in terms of characteristics. When the liquid crystal molecules are excessively twisted by the chiral agent or cholesteric liquid crystal, the liquid crystal molecules are not effectively aligned in a helical state by the helical alignment of the polymer walls. Therefore, the helical pitch of the liquid crystal material should be 360° or less with respect to the cell. When the helical pitch is more than 360°, a drive voltage for disentangling the helical liquid crystal molecules is increased, resulting in poor practicality.

The wavelength bandwidth Δλ of light to be selectively reflected is represented by the following Formula (5):

$$\Delta\lambda = \Delta n \cdot p \tag{5}$$

where $\Delta n$ is $n_e - n_o$, and p is a helical pitch.

In a mode for controlling a white scattering state and a transparent state, the wavelength bandwidth Δλ is preferably large. Examples of the liquid crystal material having a large wavelength bandwidth Δλ include those containing a cyanobiphenyl group, a cyanophenylcyclohexane group, or a chlorine atom at its terminal. More specifically, E8, E7, and BLO36 (produced by Merck & Co., Inc.) can be used. In a mode for controlling a colored state and a transparent state, the wavelength bandwidth Δλ is preferably as small as possible; in particular, 100 nm or less is preferred. Δn of the liquid crystal material is also preferably small.

A photopolymerization reaction is effected in the course of producing the liquid crystal display element of the present invention, it is preferred that the liquid crystal material is excellent in resistance to a chemical reaction. Examples of the liquid crystal having resistance to a chemical reaction include those having a functional group such as fluorine atoms. More specifically, ZLI-4801-000, ZLI-4801-001, ZLI-4792, and ZLI-4427 (produced by Merck & Co., Inc.) can be used. For selecting a liquid crystal material and a liquid crystalline compound having a polymerizable functional group, the similarity of the respective portions exhibiting liquid crystallinity should be considered in terms of compatibility between the liquid crystal material and the liquid crystalline compound. In particular, when an F type or Cl type liquid crystal material having a specific chemical environment is chosen, an F type or Cl type liquid crystalline compound should be selected.

The refractive index of the liquid crystal material is preferably in the range of $|(n_e \text{ or } n_o) - n_p| < 0.1$ ($n_p$ is a refractive index of the polymer). In the case where the refractive index is outside of this range, the refractive index of the liquid crystal is not matched with that of the polymer under the application of a voltage (i.e., saturated voltage) to cause light scattering. This results in the decrease in display quality such as poor contrast. More preferably, $n_p$ takes a value between $n_e$ and $n_o$. In the case where the refractive index of the liquid crystal is within this range, even when the liquid crystal molecules are driven upon the application of a voltage, the difference between the refractive index of the polymer and that of the liquid crystal material is decreased, whereby light scattering caused at the interface between the liquid crystal material and the polymer material can be reduced.

In order to drive the cell of the present invention by using thin film transistors (TFTs), it should be driven at a low voltage. For this purpose, it is preferred that a liquid crystal material having Δε of 4 or more is selected.

(Mixed ratio of materials)

It is required that the adding amount of the liquid crystalline polymerizable material be determined so that a mixture of the liquid crystal material, the photopolymerization initiator, and the polymerizable material takes a liquid crystalline state. Depending upon the material, the amount required for exhibiting liquid crystallinity is varied. According to the present invention, the adding amount is not particularly limited. It is preferred that the liquid crystalline polymerizable material is added in an amount in the range of 30 to 95% by weight based on the total weight of the polymerizable material. When the adding amount of the liquid crystalline polymerizable material is less than 30% by weight, a polymer liquid crystal state cannot be obtained and the polymer walls cannot have a helical structure after the mixture is polymerized. When the adding amount of the liquid crystalline polymerizable material is more than 95% by weight, sufficient supporting force of the cell cannot be obtained after the polymerization of the liquid crystalline polymerizable material because of its low elasticity.

Furthermore, it is preferred that a bifunctional liquid crystalline polymerizable material is contained in the polymerizable material in terms of response speed and polymer strength. The adding amount of the bifunctional liquid crystalline polymerizable material is in the range of 1 to 30% by weight based on the total weight of the polymerizable material. When the adding amount of the bifunctional liquid crystalline polymerizable material is less than 1% by weight, the above-mentioned effects cannot sufficiently obtained. When the adding amount of the bifunctional liquid crystalline polymerizable material is more than 30% by weight, the gelation speed of the bifunctional liquid crystalline polymerizable material during the polymerization. As a result, liquid crystal droplets dispersed in the polymer have an extremely small particle size and interaction between the liquid crystal and the polymer becomes strong. This causes the increase in drive voltage of the cell, which means that the practicality of the liquid crystal display element thus obtained is decreased.

The adding amount of the polymerizable chiral agent should be determined so as to allow the resulting liquid crystalline polymer to have a helical structure. It is preferred that the adding amount of the polymerizable chiral agent is in the range of 3 to 70% by weight based on the total weight of the polymerizable material. When the adding amount is less than 3% by weight, selective reflection of light is not sufficiently effected, and when the adding amount is more than 70% by weight, the polymer is strongly spiraled to make it impossible for the liquid crystal molecules to be aligned in accordance with the helical alignment of the polymer. Thus, when the adding amount of the polymerizable chiral agent is out of this range, the liquid crystal display element has a problem of practicality.

The mixed weight ratio of the liquid crystal and the polymerizable material (containing the liquid crystalline polymerizable material) is preferably in the range of 50:50 through 97:3, and more preferably 70:30 through 90:10. When the proportion of the liquid crystal material is below 50% by weight, the physical strength of the polymer walls becomes remarkably high to increase a drive voltage of the cell. When the proportion of the liquid crystal material is more than 97% by weight, the polymer walls are not sufficiently formed and the physical strength thereof is decreased, resulting in an unstable performance of the liquid crystal display element.

(Photopolymerization initiator)

As the photopolymerization initiator (or a catalyst), Irgacure 184, Irgacure 651, Irgacure 907, Darocure 1173, Darocure 1116, and Darocure 2959 can be used. The adding amount of the photopolymerization initiator is preferably in the range of 0.3 to 5% by weight based on the total weight of the liquid crystal and the polymerizable material. When the adding amount of the photopolymerization initiator is less than 0.3% by weight, a photopolymerization reaction is not sufficiently effected. When the adding amount of the photopolymerization initiator is more than 5% by weight, the phase-separation speed of the liquid crystal and the polymer becomes too high to be controlled; as a result, liquid crystal droplets have a small particle size to increase a drive voltage.

In the case of using a plastic substrate, UV-rays are absorbed in the substrate to make it difficult to effect the polymerization of the mixture. In this case, a visible light region is an absorption region. Thus, a photopolymerization initiator polymerizable in a visible light region is preferably used. More specifically, Lucrin TPO (produced by BASF Ltd.), KYACURE DETX-S (produced by Nippon Kayaku Co., Ltd.), and CGI 369 (produced by CIBA-GEIGY Corporation) can be used.

(Driving method)

The cell produced by using the above-mentioned materials can be driven by the simple matrix drive method, and the active matrix drive method using a TFT or an MIM (metal-insulator-metal). The driving method is not specified in this invention.

(Material for the substrates)

As a material for the substrates, a transparent solid material such as glass and a polymer film can be used. When the liquid crystal display element is used as a reflection type, a non-transparent solid material such as a substrate with a metal thin film and an Si substrate can be used.

As a material for a plastic substrate, materials having an absorption region outside of a visible light region are preferred. Examples of such materials include a PET, an acrylic polymer, styrene, and polycarbonate.

Substrates made of different materials can be attached to fabricate a cell. Furthermore, substrates having different thickness can be attached to fabricate a cell, regardless of whether the respective materials are the same or different.

Hereinafter, the present invention will be described by way of illustrative examples with reference to the drawings. It should be noted that the present invention is not limited to these examples.

EXAMPLE 1

First, a glass substrate having a thickness of 1.1 mm and another substrate having a thickness of 1.1 mm with unevenness on its surface were prepared. Each of the substrates had transparent electrodes made of ITO (mixture of indium oxide and tin oxide) having a thickness of 50 nm.

Both of the substrates were attached to each other so that the respective transparent electrodes face each other. In order to keep a predetermined cell thickness, spacers having a particle size of 10 μm were injected between the substrates to fabricate a cell.

Figure 5:
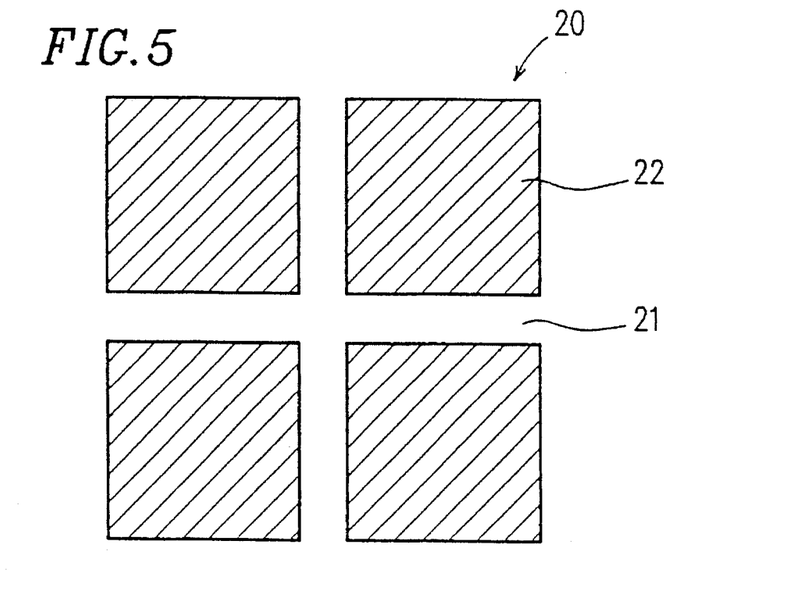
FIG. 5 is a plan view of a photomask used for producing the liquid crystal display element of the present invention.

Then, a photomask 20 having light transmitting portions 21 and light blocking portions 22 as shown in FIG. 5 were placed on the cell. A homogeneous mixture was injected through a capillary tube into the cell. The homogeneous mixture was prepared, for example, by mixing 0.05 g of R-684 (produced by Nippon Kayaku Co., Ltd.), 0.05 g of styrene, 0.7 g of liquid crystalline polymerizable material A represented by the following Formula (6), 0.20 g of polymerizable chiral agent B represented by the following Formula (7), 4 g of liquid crystal material 4792 (produced by Merck & Co., Inc.), and 0.025 g of photopolymerization initiator (Irgacure 651) so as to be homogeneous.

Next, the cell was placed below a high-pressure mercury lamp which provides collimated UV-rays at 10 mW/cm². The cell was kept at a temperature of 30° C., and under this condition, the mixture was irradiated with UV-rays for 90 seconds through the photomask 20. At this time, the UV-rays were irradiated to the cell so as to form a pattern having three-dimensional regularity.

The cell was cooled to 25° C. (at which liquid crystal is in a nematic state). The cell was continuously irradiated with UV-rays for another 3 minutes, whereby the polymerizable material was polymerized. Thereafter, the cell was heated to 100° C. and gradually cooled to 25° C. over 8 hours. During this step, liquid crystal molecules are aligned by the alignment regulating force of a helical structure of polymer walls, resulting in the enhancement of display quality.

Figure 6:
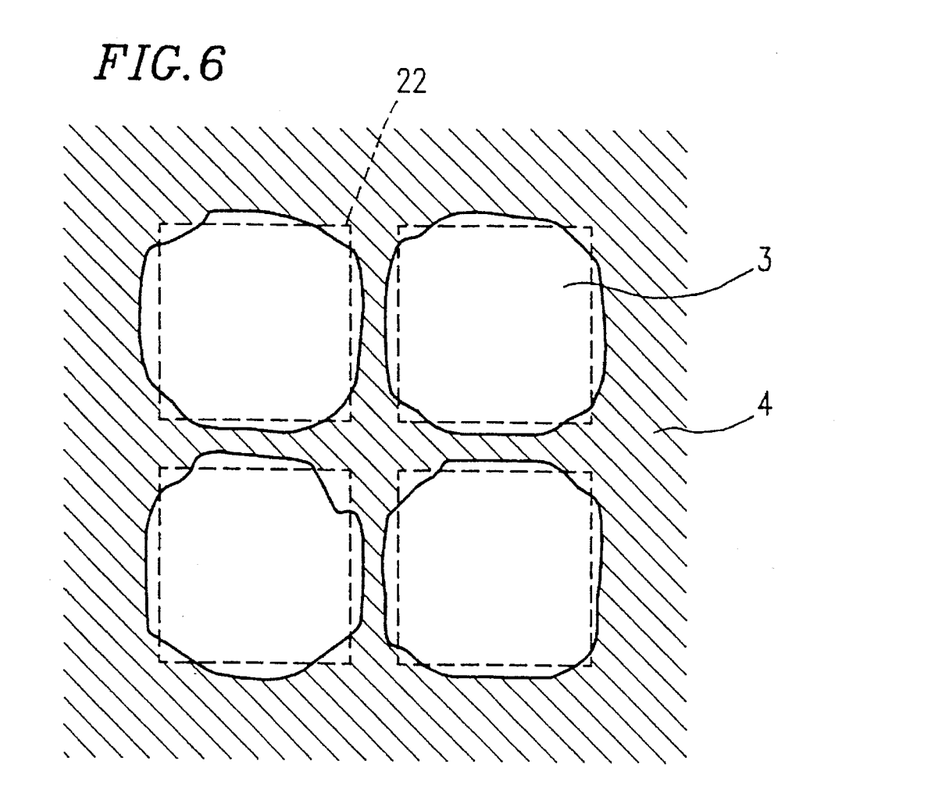
FIG. 6 is a plan view of a display medium produced by using the photomask shown in FIG. 5.

FIG. 6 is a plan view of a display medium produced by using the photomask shown in FIG. 5. The display medium thus produced had liquid crystal regions 3 and polymer walls 4. The liquid crystal regions 3 have substantially the same shape as that of the light blocking portions 22 of the photomask 20.

In order to evaluate the adhesion between the polymer walls 4 and the substrates, a square having a size of 20 mm containing only a polymer wall and a liquid crystal region was cut out of the cell. Then, one of the substrates was pulled off, but only with difficulty.

EXAMPLE 2

A cell was fabricated in the same way as in Example 1. A mixture was injected through a capillary tube into the cell. The mixture was obtained by mixing 0.05 g of R-684 (produced by Nippon Kayaku Co., Ltd.), 0.75 g of the liquid crystalline polymerizable material A, 0.20 g of the polymerizable chiral agent B, 4 g of liquid crystal material (ZLI-4792, produced by Merck & Co., Inc.), and 0.025 g of photopolymerization initiator (Irgacure 651) so as to be homogeneous.

Next, the cell was placed below a high-pressure mercury lamp which provides collimated UV-rays at 30 mW/cm². The cell was kept at a temperature of 30° C., and under this condition, the mixture was irradiated with UV-rays for 90 seconds through the transparent glass substrate. Thus, a liquid crystal display element of the present example was produced.

The liquid crystal display element thus produced was observed with a microscope which showed that a three-dimensional network structure, in which the liquid crystal material was mixed in the polymer walls, was formed in the cell. More specifically, a polymer dispersed type liquid crystal cell was produced.

Table 1 shows electro-optic characteristics of the cells of Examples 1 and 2, and a cell of Comparative Example 1 described below.

TABLE 1

|  | Example 1 | Example 2 | Comparative Example 1 |
|---|---|---|---|
| Contrast | 9 | 10 | 4 |
| Drive voltage V$_{90}$, V | 15 | 17 | 50 or higher |

Comparative Example 1

A mixture was injected into the cell fabricated in the same way as in Example 1. The cell was irradiated with UV-rays in the same way as in Example 2 to produce a polymer dispersed type liquid crystal display element.

The mixture was obtained by mixing 0.05 g of R-84 (produced by Nippon Kayaku Co., Ltd.), 0.05 g of styrene, 0.7 g of the liquid crystalline polymerizable material A, 0.20 g of chiral agent (S-811), 4 g of liquid crystal material (ZLI-4792, produced by Merck & Co., Inc.), and 0.025 g of photopolymerization initiator (Irgacure 651) so as to be homogeneous.

The cell thus obtained had a structure in which the liquid crystal material containing the chiral agent is dispersed in the polymer.

As is understood from Table 1, in Comparative Example 1, contrast is low (i.e., 4) and a drive voltage is 50 volts or more; in Examples 1 and 2, contrasts are high (i.e., 9 and 10, respectively) and drive voltages are about 15 volts, respectively. Thus, the liquid crystal display elements produced in Examples 1 and 2 have a high practical value.

EXAMPLE 3

Figure 7:
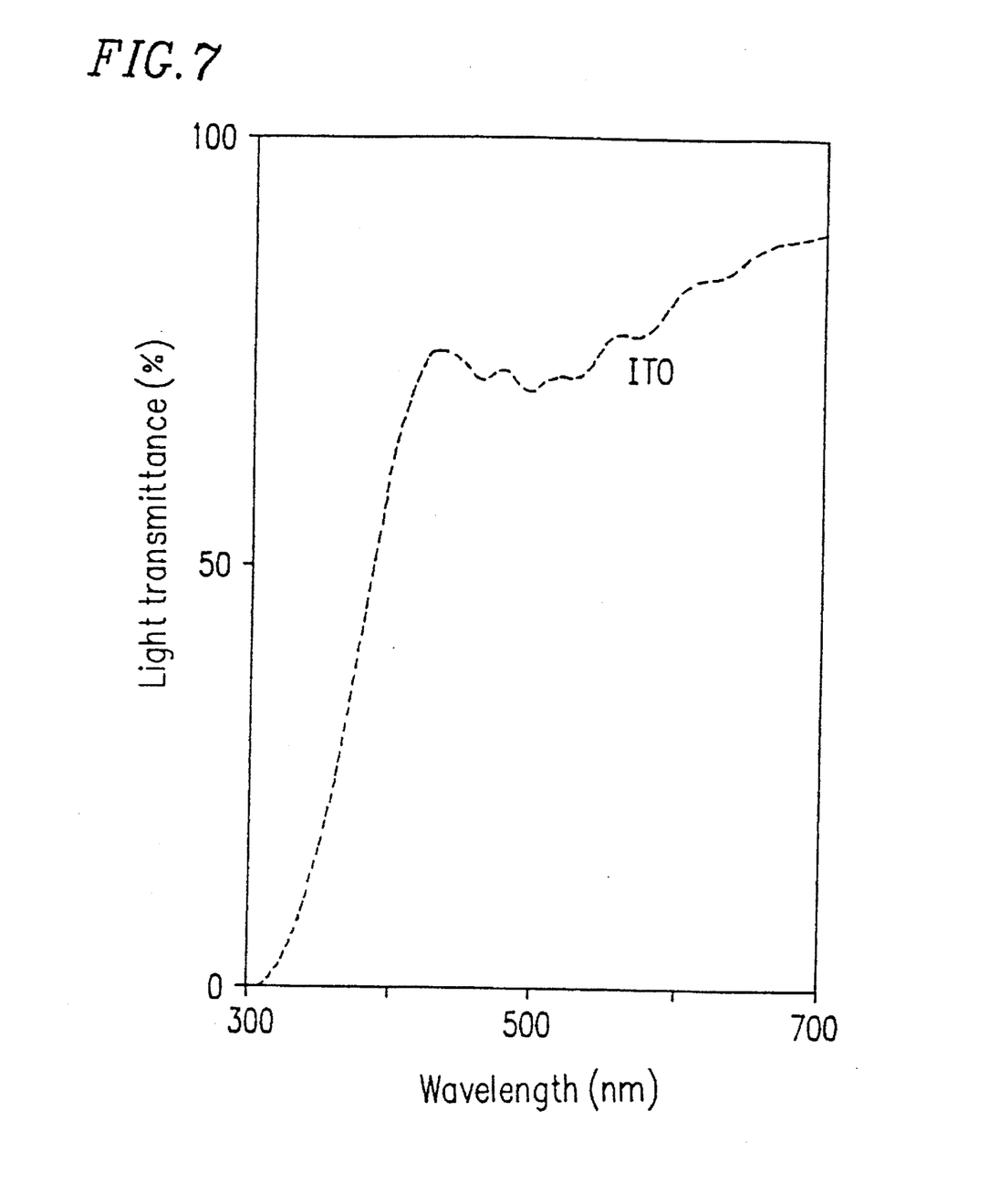
FIG. 7 is a graph showing the relationship between a light wavelength and a light transmittance of a plastic substrate used in the present invention.

First, two acrylic plastic substrates having a thickness of 400 μm were prepared. The substrates substantially block light having a wavelength of 250 nm or less, as is represented by an absorption curve in FIG. 7.

The substrates were attached to each other with spacers having a particle size of 10 μm injected there-between in the same way as in Example 1 to fabricate a cell. In this example, a reflective plate is provided with light transmitting regions so as to correspond to those of the photomask used in Example 1. By doing so, even though a photomask is not actually provided outside of the cell, the substantially same structure as that having a photomask can be obtained. In this structure, since the liquid crystal regions are positioned closer to light regulating means (i.e., the photomask is used in Example 1) by thickness of the substrate, the polymer walls can be prevented from being formed in the pixels by the light diffraction of a photomask. Furthermore, this structure simplifies the production steps.

Then, a mixture was injected in a vacuum into the cell. The mixture was obtained by mixing 0.05 g of R-684 (produced by Nippon Kayaku Co., Ltd.), 0.05 g of styrene, 0.7 g of the liquid crystalline polymerizable material A, 0.20 g of the polymerizable chiral agent, 4 g of liquid crystal material (ZLI-4792, produced by Merck & Co., Inc.), and 0.025 g of photopolymerization initiator (Lucirin TPO, produced by BASF Ltd.) having a local maximum light absorption in the vicinity of 400 nm so as to be homogeneous.

Next, the cell was kept at a temperature of 80° C., and under this condition, the cell was continuously irradiated with UV-rays in the same way as in Example 1 through the reflective plate for three minutes. The cell was cooled to 25° C. and irradiated with UV-rays for another 7 minutes. Thereafter, the cell was heated to 100° C. and gradually cooled to 25° C. over 8 hours.

The liquid crystal display element thus produced had good contrast and superior adhesion between the polymer walls and the substrates as in the other examples. Furthermore, the liquid crystal display element of the present example was much improved compared with conventional examples in terms of a practical value.

EXAMPLE 4

First, a mixture was injected into the cell fabricated in the same way as in Example 1. The mixture was obtained by mixing 0.05 g of bifunctional liquid crystalline polymerizable material C represented by the following Formula (8), 0.05 g of styrene, 0.3 g of the liquid crystalline polymerizable material A, 0.6 g of the polymerizable chiral agent B, 4 g of liquid crystal material (ZLI-4792, produced by Merck & Co., Inc. ), and 0.025 g of photopolymerization initiator (Irgacure 651) so as to be homogeneous.

(8)

where R is $CH_2=CHCOO(CH_2)_8O$

The cell was irradiated with UV-rays in the same way as in Example 1 under the condition that a voltage with a square wave at ±10 volts and 60 Hz was applied to the electrodes on the substrates.

In the resulting cell, under the application of no voltage, the pixel portions selectively reflected green light and the other portions were in a scattered state (i.e., nearly white state) because of randomly aligned helical axes. Under the application of a voltage, the pixel portions were in a transparent state. In the case of using a white scattering plate at the back of the cell, a colored state was obtained by selective reflection of light under the application of no voltage, and a white state was obtained as a whole under the application of a voltage. More specifically, under the application of a voltage, the pixel portions and the polymer walls were in a transparent state, allowing the white scattering plate to be seen. It is noted that the color of reflected light caused by selective reflection can be varied depending upon the adding amount of the polymerizable chiral agent.

The liquid crystal display element thus produced had good contrast and superior adhesion between the polymer walls and the substrates as in the other examples. Furthermore, the liquid crystal display element of the present example was much improved compared with conventional examples in terms of a practical value.

As described above, according to the present invention, a display medium containing a polymer and liquid crystal is obtained. In spite of the fact that the liquid crystal does not contain sufficient chiral agent, the helical alignment of the polymer is transmitted to the liquid crystal regions, whereby the liquid crystal material in the liquid crystal regions selectively reflect light. Furthermore, the liquid crystal display element of the present invention is of a reflection type, and the adding amount of chiral agent to the liquid crystal material is smaller than that of a conventional liquid crystal display element using selective reflection. Therefore, the liquid crystal display element of the present invention can be driven at a low voltage. Still furthermore, because of color purity of reflected light and a white state obtained by forward scattering of light, the liquid crystal display element of the present invention can be used for a reflection type display system with high contrast and a low power consumption such as portable information terminal apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display element comprising walls made from a polymer material and liquid crystal regions in contact with the walls between a pair of substrates, each having electrodes, wherein the liquid crystal region is in a selective reflection state and a chiral pitch of liquid crystal contained in the liquid crystal regions is longer than a chiral pitch of the walls made from a polymer material.

2. A liquid crystal display element according to claim 1, wherein a liquid crystalline polymer material is contained in the walls made from a polymer material.

3. A liquid crystal display element according to claim 2, wherein the liquid crystalline polymer material contains a compound having a chiral center.

4. A liquid crystal display element according to claim 1, wherein the walls made from a polymer material are patterned, and the liquid crystal display element has liquid crystal regions at least partially surrounded by the walls.

5. A liquid crystal display element according to claim 1, wherein the liquid crystal regions are surrounded by the walls made from a polymer material with a three-dimensional network structure.

6. A liquid crystal display element according to claim 1, wherein a helical axis of the liquid crystal molecules is substantially perpendicular to the substrates.

7. A liquid crystal display element according to claim 1, wherein a reflective plate is provided on one of the pair of substrates.

8. A liquid crystal display element according to claim 1, wherein a coloring plate is provided on one of the pair of substrates.

9. A liquid crystal display element according to claim 1, further comprising a color filter allowing a visible light to transmit therethrough and blocking UV-rays to 70% or less at a wavelength of 365 nm.

10. A liquid crystal display element according to claim 1, comprising a reflective plate at least part of which has regular portions for allowing light to pass through.

11. A method for producing a liquid crystal display element, comprising the steps of:

injecting a mixture containing a liquid crystal material, a liquid crystalline compound having polymerizable functional groups in its molecules, a polymerizable chiral agent, and a photopolymerization initiator between a pair of substrates, either one of the substrates being transparent and each of the substrates having electrodes, molecules having a chiral center being added to either one of the liquid crystal material or the liquid crystalline compound; and irradiating light having regular strong and weak portions to the mixture to phase-separate the mixture into a liquid crystal material and a polymer material by photopolymerization, thereby allowing at least part of liquid crystal regions to be surrounded by walls made from the polymer material.

12. A method for producing a liquid crystal display element according to claim 11, wherein a photomask is used for allowing the light to have regular strong and weak portions.

13. A method for producing a liquid crystal display element according to claim 11, wherein at least one of an electric field and a magnetic field is provided to the mixture during the light irradiation.

14. A method for producing a liquid crystal display element according to claim 11, wherein the mixture is photo-polymerized under a condition of one of an isotropic phase and a nematic phase, and the mixture is photo-polymerized again under a condition of one of a smectic phase and a nematic phase.

15. A method for producing a liquid crystal display element according to claim 11, wherein the mixture is injected between the pair of substrates under a condition of one of an isotropic phase and a nematic phase, the mixture is heated so as to be an isotropic phase, the mixture is then cooled so as to be a nematic phase, and the mixture is irradiated with UV-rays.

* * * * *